United States Patent [19]
Tsai

[11] Patent Number: 5,455,102
[45] Date of Patent: Oct. 3, 1995

[54] COOKING UTENSIL WITH A HARD AND NON-STICK COATING

[76] Inventor: Tung-Hung Tsai, No.20, Lane 104, Ta-Liao Rd., Ta-Lia Tsun, Ta-Liao Hsiang, Kaohsiung Hsien, Taiwan

[21] Appl. No.: 252,897

[22] Filed: Jun. 2, 1994

Related U.S. Application Data

[62] Division of Ser. No. 55,680, Apr. 29, 1993, Pat. No. 5,411,771.

[51] Int. Cl.$^6$ .............................. B32B 15/08; B32B 27/30
[52] U.S. Cl. .............................. 428/141; 99/422; 99/445; 126/390; 428/334; 428/335; 428/336; 428/422; 428/461; 428/463
[58] Field of Search ...................... 428/141, 422, 428/334, 335, 336, 421, 461, 463; 427/448, 449, 455, 456; 99/422, 445; 126/390

[56] References Cited

U.S. PATENT DOCUMENTS

| | | | |
|---|---|---|---|
| 3,900,684 | 8/1975 | Edwards et al. | 427/385 |
| 4,070,525 | 1/1978 | Vassiliou et al. | 428/422 |
| 4,196,256 | 4/1980 | Eddy et al. | 428/422 |
| 4,252,859 | 2/1981 | Concannon et al. | 428/422 |
| 4,395,445 | 7/1983 | Gebauer et al. | 427/407.1 |
| 4,568,573 | 2/1986 | Sunada et al. | 427/350 |
| 4,683,168 | 7/1987 | Hares et al. | 428/335 |
| 4,808,490 | 2/1989 | Tsukuda et al. | 428/699 |
| 4,862,609 | 9/1989 | Ulrich et al. | 428/450 |

Primary Examiner—D. S. Nakarani
Attorney, Agent, or Firm—Ladas & Parry

[57] ABSTRACT

A method for coating metal cookware includes (a) roughening and cleaning a cooking surface of the metal cookware's inner wall by spraying aluminum oxide of 60–80 mesh onto the inner wall surface; (b) applying a mechanically resistant layer onto the roughened and cleaned cooking surface of the metal cookware by electric-arc spraying at a temperature of 4500°–8000° C., under a pressure of 5–8 kg/cm$^2$, and with a voltage of 30–40 V and a direct current of 100–300 A, the mechanically resistant layer being made of a metallic material, and (c) applying a lubricative layer, which consists essentially of PTFE (polytetrafluoroethylene), onto the mechanically resistant layer by spray coating until the lubricative layer has a thickness of about 23–36 μm and whereby a pencil hardness of 8–9 H is achieved.

4 Claims, 3 Drawing Sheets

COOKING UTENSIL WITH A HARD AND NON-STICK COATING

This is a divisional of application Ser. No. 08/555,680 filed on Apr. 29, 1993, now U.S. Pat. No. 5,411,771.

BACKGROUND OF THE INVENTION

1. Field of the Invention

This invention relates to a method for coating a substrate, more particularly to a method for coating metal cookware with a very hard and non-stick coating.

2. Description of Related Art

U.S. Pat. No. 4,862,609 discloses an ironing sole plate that has a composite coating of a mechanically resistant compound. The sole plate is coated by applying a layer of mechanically resistant ceramic or metallic material to the sole plate's aluminum base body and subsequently applying an organic bonding agent, composed of a resinous binding material enriched by PFE, PFA or silicone, to the mechanically resistant layer. It is noted that the application of an excessively thick coating of the bonding agent to the mechanically resistant layer, although it increases the non-stick ability of the sole plate, will reduce its scratch resistance. Therefore, only a thin coating of the bonding agent is applied, having a mean thickness of below ten micrometers, preferably between 0.01 and 2 micrometers. In addition, other coating methods have been disclosed in U.S. Pat. Nos. 3,900,684, 4,070,525, 4,196,256, 4,252,859, 4,395,445, 4,568,573, 4,683,168 and 4,808,490. When the previous techniques are combined and are adopted to manufacture coated metal cookware, the resulting product oftentimes has a hard cooking surface but greasy dirt is liable to accumulate on the cooking surface since a thin coating consisting of PTFE cannot provide sufficient non-stick ability. Since the greasy dirt is difficult to remove and causes a reduction of a pan's heat conductivity efficiency; cookware thus afflicted often must be subjected to excessive heat in order to obtain desired results. When an excessively thick coating consisting of PTFE is applied in order to increase the non-stick ability and prevent the accumulation of greasy dirt, the hardness of the surface is decreased, thereby reducing the scratch resistance.

SUMMARY OF THE INVENTION

Therefore, the objective of this invention is to provide a method for coating metal cookware so that cookware with a very hard and non-stick cooking surface can be manufactured.

Accordingly, a method for coating metal cookware includes (a) roughening and cleaning a cooking surface of an inner wall of metal cookware by spraying aluminum oxide of 60–80 mesh onto the cooking surface, (b) applying a mechanically resistant layer, made of a metallic material, onto the roughened and cleaned cooking surface of the metal cookware by electric-arc spraying at a temperature of 4500°–8000° C., under a pressure of 5–8 kg/cm$^2$ and with a voltage of 30–40 V and a direct current of 100–300 A, and (c) applying a lubricative layer, consisting essentially of PTFE (polytetrafluoroethylene), onto the mechanically resistant layer by spray coating until the lubricative layer has a thickness of about 23–36 μm and whereby a pencil hardness of 8–9 H is achieved.

The step (c) may include the following steps: (c1) applying a primer coating, consisting essentially of PTFE and a binder resin, onto the mechanically resistant layer until the primer coating has a thickness of about 5–10 μm, (c2) applying a top coating, consisting essentially of PTFE, onto the primer coating until the top coating has a thickness of about 15–20 μm, and (c3) applying a clear coating, consisting essentially of PTFE, onto the top coating until the clear coating has a thickness of 3–6 μm.

The metal cookware may be made of a metal selected from the group consisting of iron, steel, copper and aluminum.

The roughened and cleaned cooking surface of the metal cookware should have a roughness of 4.5–5.5 μm (Ra). The mechanically resistant layer on the metal cookware should have a thickness of 40–90 μm and a roughness of 5.0–8.0 μm (Ra). The lubricative layer on the coated metal cookware after the step (c) should have a roughness of 2.5–5.5 μm (Ra).

BRIEF DESCRIPTION OF THE DRAWINGS

Other features and advantages of the present invention will become apparent in the following detailed description of the preferred embodiment, with reference to the accompanying drawings, in which.

DETAILED DESCRIPTION OF THE PREFERRED EMBODIMENT

Figure 1:
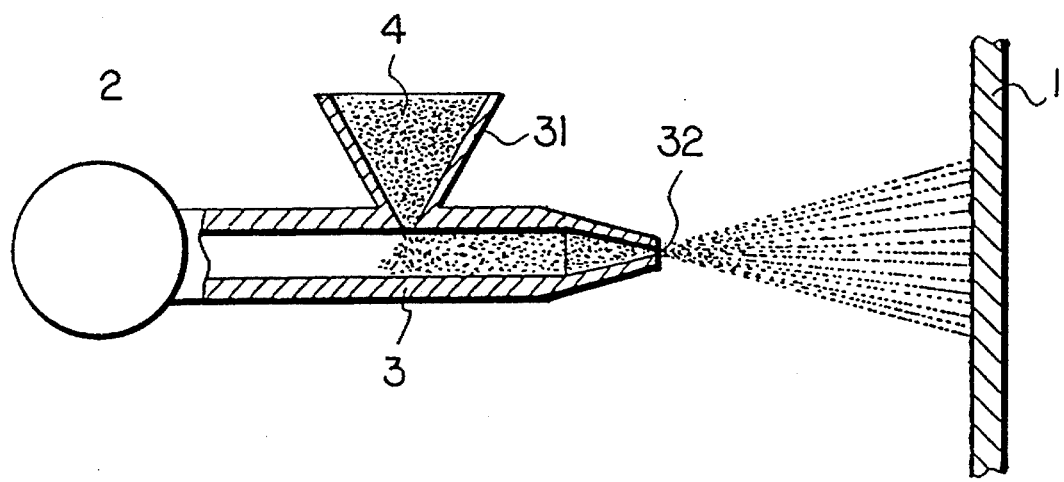
FIG. 1 shows powdered aluminum oxide being sprayed onto a cooking surface of a metal pan to roughen and clean the cooking surface.

It should be noted that in the following detailed description, like elements are indicated by the same reference numerals throughout the disclosure.

A cast metal pan, which is made of copper, aluminum or stainless steel, is provided. The pan has an inner wall (1) which confines a food receiving space which has a cooking surface. Referring to FIG. 1, powdered aluminum oxide (4) of 60–80 mesh is contained in a funnel (31) which is connected to a nozzle (3). The nozzle (3) is connected to a device (2) containing compressed gas therein. The pressure of the compressed gas is 5–8 kg/cm$^2$. The pan is located at a proper distance from a nozzle exit (32) of the nozzle (3). The powdered aluminum oxide (4) is propelled through the nozzle (3) by the compressed gas onto the cooking surface of the inner wall (1) of the pan in order to roughen and clean the cooking surface. The roughened and cleaned cooking surface of the inner wall (1) has an average roughness of Ra 4.5–5.5 μm. The cooking surface of the inner wall (1) is roughened and cleaned so as to facilitate the attachment and bonding of a further coating thereon.

Figure 2:
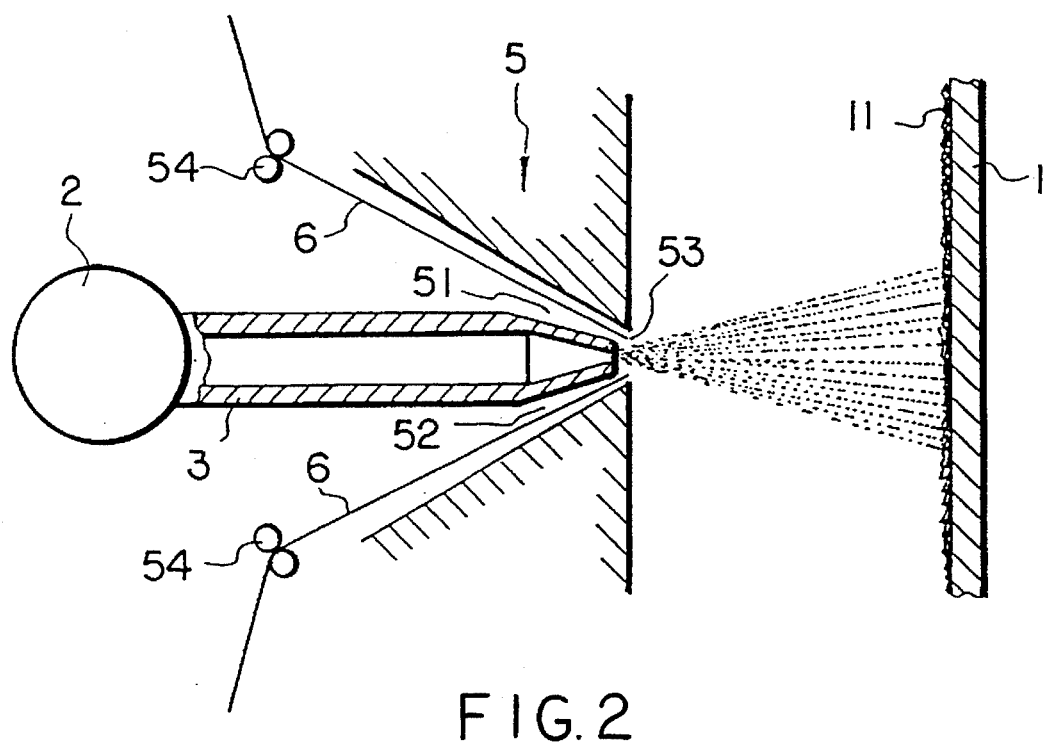
FIG. 2 shows a mechanically resistant layer being applied to the roughened and cleaned cooking surface of the metal pan in FIG. 1.

FIG. 2 shows that a mechanically resistant layer (11) is applied to the roughened and cleaned cooking surface of the inner wall (1) by electric-arc spraying. The mechanically resistant layer (11) can be made of a metallic material which has a melting temperature of about 4500° C. Appropriate metallic materials include copper, zinc, nickel, chromium, aluminum, carbon steel and other stainless steels. An electric arc device (5) is mounted adjacent to the nozzle (3) and is conducted at a temperature of 4500°–8000° C., under a pressure of 5–8 kg/cm$^2$, and using a voltage of 30–40 V and a direct current of 100–300 A. Two metal wires (6) are respectively fed, by means of two roller devices (54), into the electric arc device (5) along two passages (51, 52) toward an opening (53). It is noted that the inner wall (1) is located from the opening (53) at a distance of about 20–50 cm. The metal wires (6) are melted by means of the electric arc device (5) and are propelled by the compressed gas in the device (2) so as to be sprayed onto the roughened and cleaned cooking surface of the inner wall (1) at a speed of 100–300 m/sec, thus forming the mechanically resistant layer (11). The hot melted metal wires (6) are cooled at a rate of 1,000,000 DGE/°F./sec while they are sprayed onto the roughened and cleaned cooking surface from the opening (53) of the electric arc device (5). Thus, the mechanically resistant layer (11) is formed on the roughened and cleaned cooking surface at a temperature of between 60° C. and 150° C. as to prevent the deformation of the metal pan. Even if a thin metal pan is used, deformation will not occur. It is noted that in a preferred embodiment of this invention, the metal pan is stainless steel and the metal wires (6) are made of a low carbon stainless steel, standard 410 or 430. The mechanically resistant layer (11) formed on the cooking surface of the inner wall (1) has a thickness preferably of about 40–90 μm and an average roughness of 5.0–8.0 μm (Ra) and exhibits an increased hardness. The temperature required for the electric arc heating is dependent on the material used for the mechanically resistant layer (11).

Figure 3:
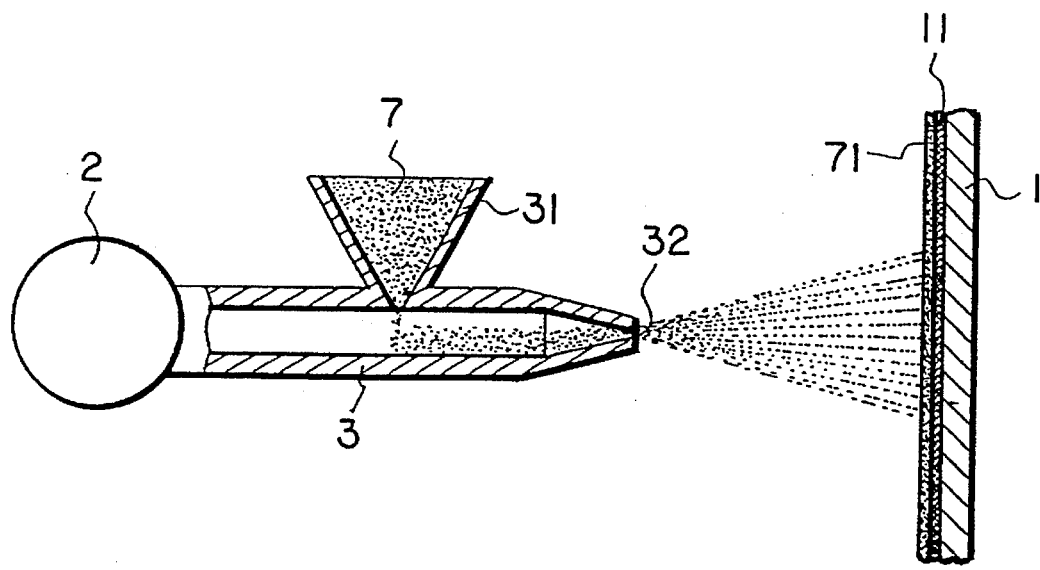
FIG. 3 shows a primer coating of a lubricative layer being applied over the mechanically resistant layer in FIG. 2.
Figure 4:
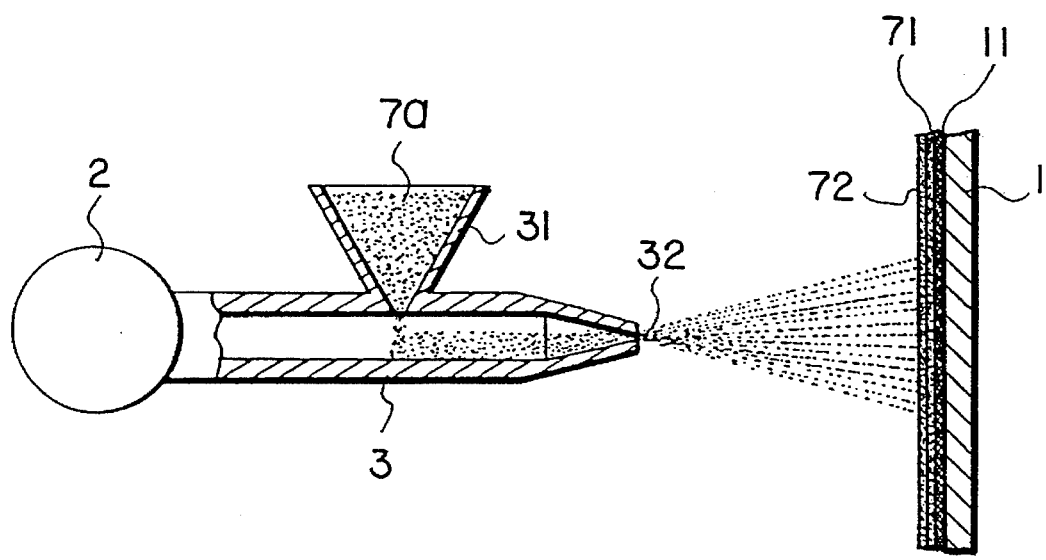
FIG. 4 shows a top coating of the lubricative layer being applied over the primer coating of FIG. 3.
Figure 5:
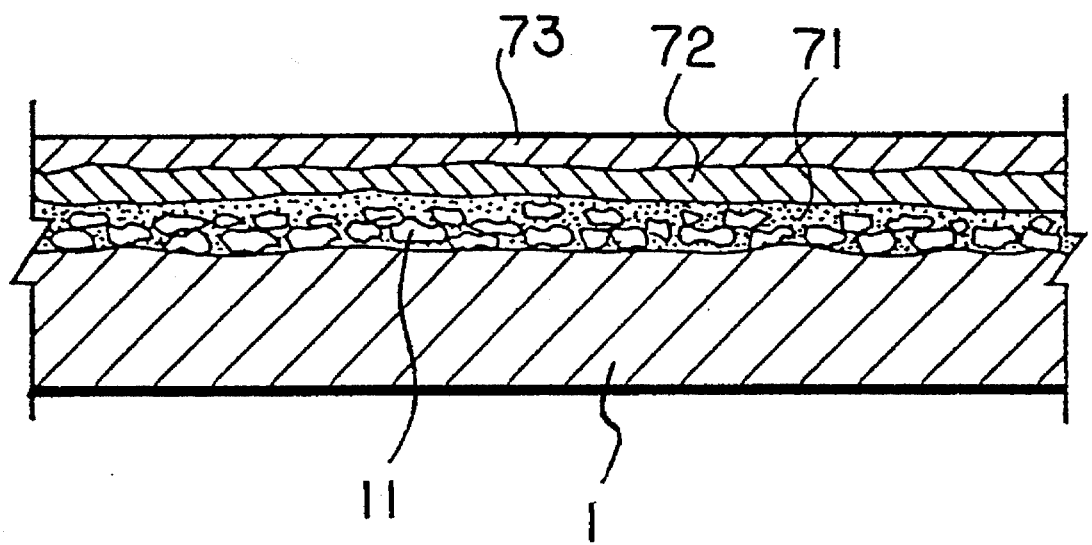
FIG. 5 is a schematic sectional view of the resulting coated metal pan.

FIGS. 3 to 5 show that a lubricative layer is applied over the mechanically resistant layer (11) by a known spray coating technique. The lubricative layer includes a primer coating (71), a top coating (72) and a clear coating (73). The primer coating composition contains PTFE (polytetrafluoroethylene), a binder resin, a pigment, a surface active agent and a solvent, such as water. PTFE, the binder resin, the pigment and the surface active agent together account for 30–40% of the weight of the primer coating's composition. The top coating composition contains PTFE, a pigment, a surface active agent and a solvent, such as water. PTFE, the pigment and the surface active agent together account for about 40–50% of the weight of the top coating's composition. The clear coating composition contains PTFE, a surface active agent and a solvent, such as water. The PTFE and the surface active agent together account for less than 60% of the weight of the clear coating's composition. The PTFE in the primer, top and clear coatings (71, 72, 73) is in the majority with respect to the binder resin, the pigment and the surface active agent, respectively. The amount of the binder resin is approximately ⅓ or less of the amount of PTFE.

Referring again to FIG. 3, the composition (7) of the primer coating (71) is received via the funnel (31) and is propelled by the compressed gas in the device (2) through the nozzle (3) to spray onto the mechanically resistant layer (11) already on the cooking surface of the inner wall (1). At this point, the inner wall (1) of the metal pan is heated to a temperature of 90°–150° C. for 5–10 minutes so as to dry the primer coating (71) that was sprayed on the cooking surface of the inner wall (1). The thickness of the primer coating (71) formed on the cooking surface is about 5–10 μm.

Referring again to FIG. 4, the composition (7a) of the top coating (72) is received via the funnel (31) and is propelled by the compressed gas in the containing device (2) through the nozzle (3) to spray onto the primer coating (71) already on the cooking surface of the inner wall (1). At this point, the inner wall (1) of the metal pan is heated to a temperature of 90°–150° C. for 5–10 minutes so as to dry the top coating (72) that was sprayed on the cooking surface of the inner wall (1). The thickness of the top coating (72) formed on the cooking surface is about 15–20 μm.

Referring again to FIG. 5, the clear coating composition is sprayed onto the top coating (72) already on the cooking surface of the inner wall (1). At this point, the inner wall (1) is heated to a temperature of 400°–420° C. for 3–5 minutes so as to dry the clear coating (73) that was sprayed on the cooking surface of the inner wall (1). The thickness of the clear coating (73) formed on the cooking surface is about 3–6 μm. The resultant thickness of the lubricative layer, which includes the primer coating (71), the top coating (72) and the clear coating (73), is about 23–36 μm. The PTFE in the lubricative layer is sprayed over the mechanically resistant layer (11) and fills valleys formed on the surface of the mechanically resistant layer (11). Providing the mechanically resistant layer (11) facilitates the attachment and bonding of the lubricative layer and increases the hardness of the inner wall (1). In addition, the lubricative layer may be formed by spraying one to five times.

According to the above described coating method, the resultant cooking surface of the inner wall (1) of the metal pan has an average roughness of 2.5–5.5 μm (Ra) and a pencil hardness of 8–9 H due to the provision of both the mechanically resistant layer (11) and the 23–36 μm lubricative layer. Thus, the coated cooking surface of the metal pan can have a good non-stick characteristic while maintaining a high level of hardness. Therefore, the coated metal pan according to the present invention is non-stick so as to be easily cleaned, yet is unlikely to be abraded.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A cooking utensil comprising a metal container having an interior roughened cooking surface and a composite coating, said composite coating having a metallic abrasion resistant layer of metal formed on said roughened cooking surface, and a lubricative layer which consists essentially of polytetraflouroethylene formed on said metallic abrasion-resistant layer, said roughened cooking surface having a roughness of 4.5–5.5 μm to facilitate attachment and bonding thereto of said metallic abrasion-resistant layer, said metallic abrasion-resistant layer having a thickness of 40–90 μm and a roughness of 5.0–8.0 μm to increase the hardness of the cooking surface and to facilitate attachment and bonding of the lubricative layer, said lubricative layer having a roughness of 2.5–5.5 μm.

2. A cooking utensil as claimed in claim 1, wherein said metal of said metallic abrasion-resistant layer is selected from the group consisting of steel, copper and aluminum.

3. A cooking utensil as claimed in claim 1, wherein said lubricative layer has a thickness of about 23–26 μm.

4. A cooking utensil as claimed in claim 3, wherein said lubricative layer coated on said interior cooking surface has a pencil hardness of 8–9 H.

* * * * *